UNITED STATES PATENT OFFICE.

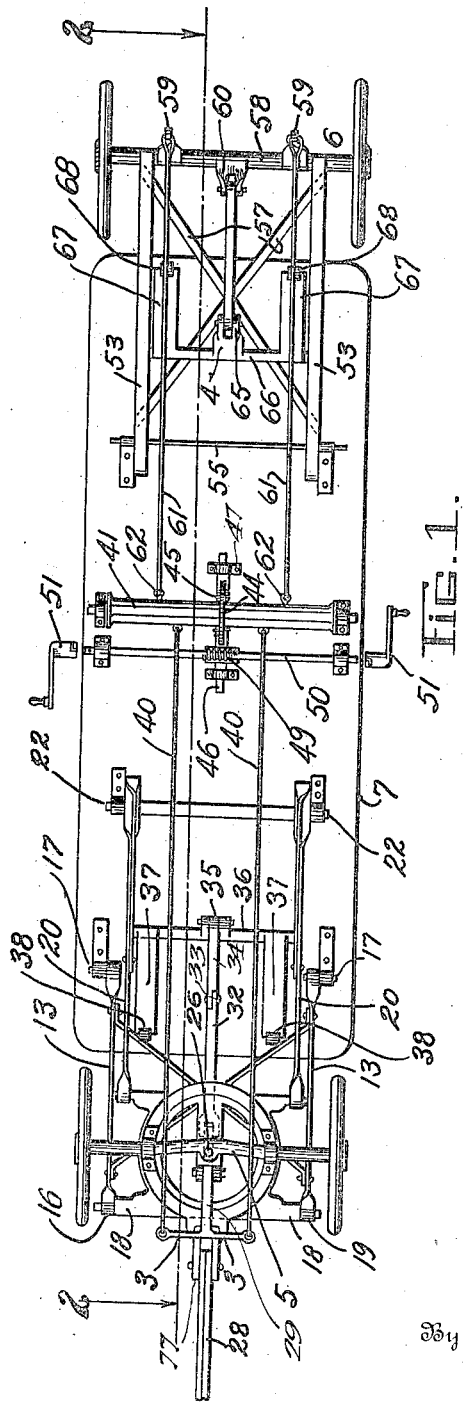

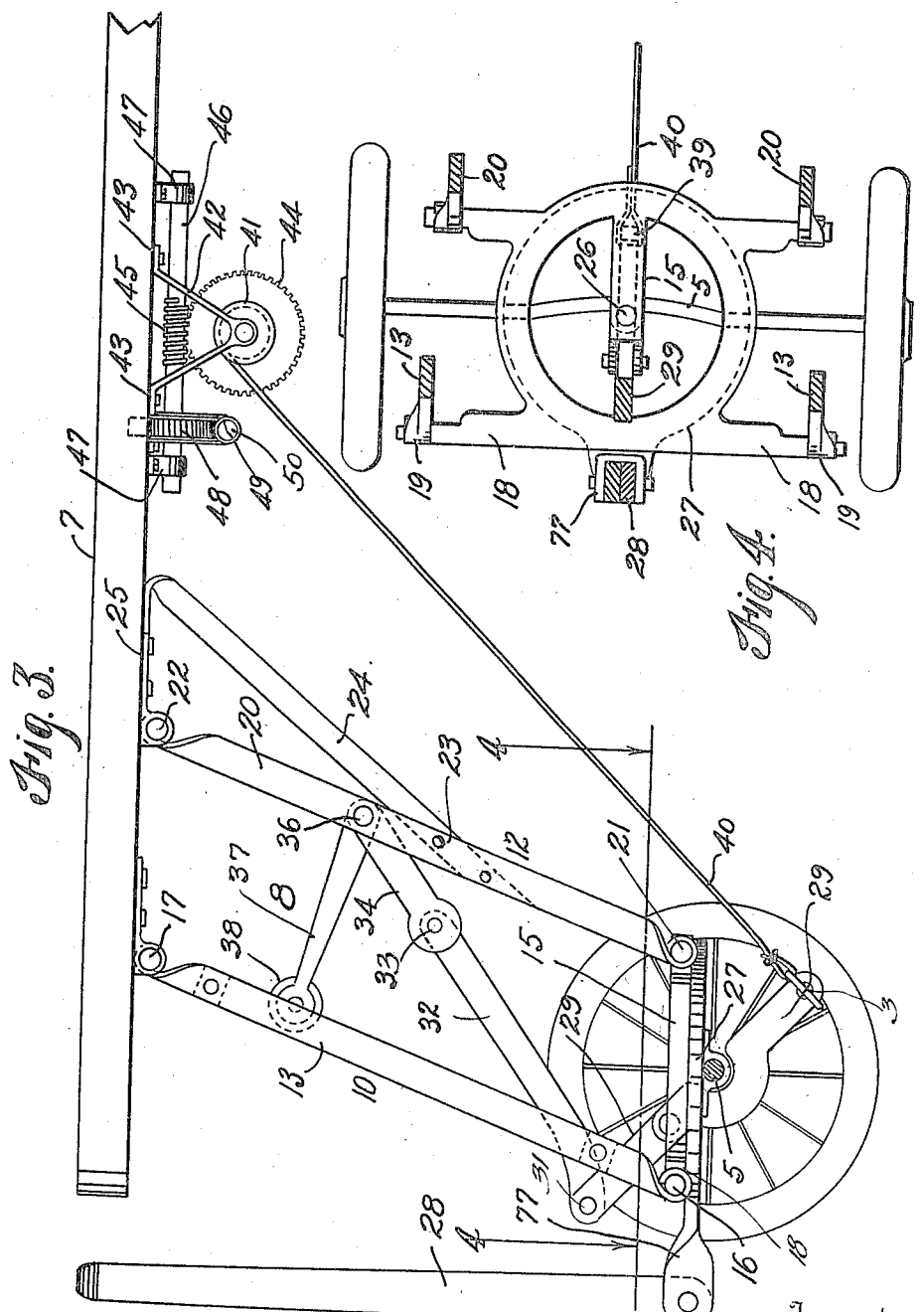

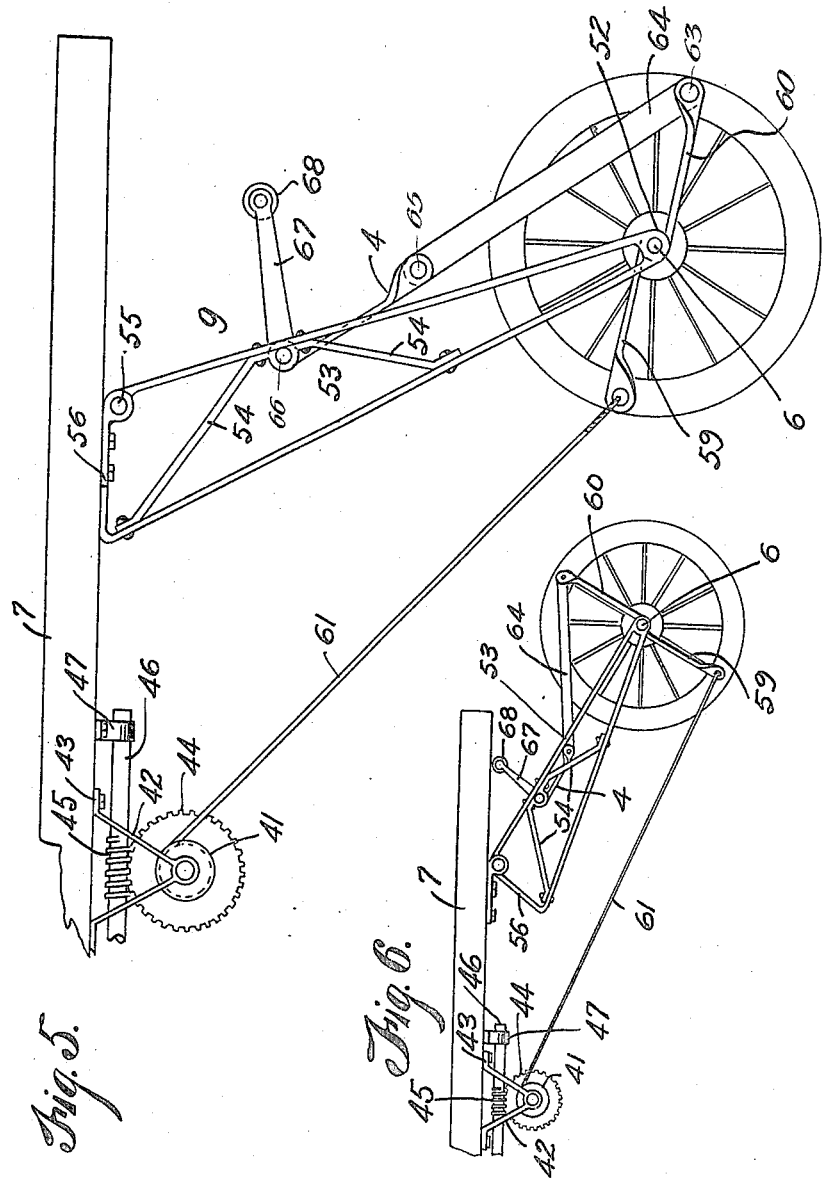

AXEL G. STEPHENSON AND HARRY H. BARSBY, OF DENVER, COLORADO.

VERTICALLY-ADJUSTABLE PLATFORM-TRUCK.

1,301,616.         Specification of Letters Patent.     Patented Apr. 22, 1919.

Application filed December 22, 1917. Serial No. 208,502.

*To all whom it may concern:*

Be it known that we, AXEL G. STEPHENSON and HARRY H. BARSBY, citizens of the United States, residing at the city and county of Denver and State of Colorado, have invented certain new and useful Improvements in Vertically-Adjustable Platform-Trucks; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in trucks more especially adapted for use at railway stations in the handling of baggage, both for loading, unloading and transporting between the cars and the baggage room. Our object is to provide a construction of this class in which the platform upon which the baggage is placed is arranged to be readily and comparatively easily shifted from a low to a high position, and vice versa. It is well understood that it is important during the loading of the pieces of baggage upon the truck that the platform should be low so that the baggage only need be lifted a minimum height. It is also important when loading the baggage into the car or unloading from the car that the platform be approximately at the same level as the bottom of the car from which the articles are taken, or in which they are to be placed.

Hence, our object is to provide a truck of this class of such construction that it is practicable to raise the platform to the desired height and also to lower it, as circumstances may require. In the construction disclosed, we have shown means for manually adjusting the platform through the medium of a sort of windlass or winch construction, detachable cranks being applied to opposite ends of a shaft which has a worm gearing connection with a winding drum, cables being connected with the said drum at one extremity and operatively connected with the front and rear axles of the truck at the opposite extremity, the construction and arrangement being such that as the drum is rotated, the cables are wound thereon and through the medium of such winding and their connections, the platform is gradually elevated and the front and rear wheels caused to approach each other, the axles of the wheels being so connected with the platform supporting structure, that as the platform is elevated the wheels must approach each other, and conversely when the front and rear wheels approach each other, the platform must rise. Hence, during the lowering of the platform, the front and rear wheels and their axles recede from each other allowing the platform to assume a relatively low position without interference of the wheels, since when the platform is at its minimum low level, it is considerably below the tops of the truck wheels.

During the initial operation of the mechanism, provision is made as the drum is actuated, to lift the platform through the medium of cranks connected with rock shafts, the latter being actuated through the connections between the drum and the said shafts, while after the initial lifting movement has occurred, the power of the drum is applied directly to cause the axles to approach each other and thus effect the completion of the platform raising act. By virtue of this arrangement, the power employed for rotating the drum is advantageously applied first through the medium of the rock shafts and at the time when a direct pull on the axles to cause them to approach each other would be ineffective; while afterward after the platform is partially elevated, the direct pull on the axles is advantageous, since the axles are connected with the supporting mechanism, and as the lower extremities of the supporting structure are caused to approach each other while the upper extremities of this structure are hingedly connected with this platform, the latter is easily raised to its maximum height.

Having briefly outlined our improvement, we will proceed to describe the same in detail, reference being made to the accompanying drawing in which is illustrated an embodiment thereof. In this drawing:

Figure 1 is an underneath view of our improved truck shown with the platform in the lowermost position taken as indicated by line and arrows 1—1 of Fig. 2.

Fig. 2 is a vertical longitudinal section taken on the line 2—2, Fig. 1 viewed in the direction of the arrows.

Fig. 3 is a fragmentary elevation of the truck structure, the forward axle being shown in cross section and the parts on a larger scale.

Fig. 4 is a horizontal section taken on the line 4—4, Fig. 3 looking downwardly.

Fig. 5 is a view similar to Fig. 3, but illustrating the rear portion of the truck, showing the platform in an elevated position.

Fig. 6 is a view similar to Fig. 5 though on a somewhat smaller scale, showing the platform in an intermediate position.

The same reference characters indicate the same parts in all the views.

Let the numerals 5 and 6 respectively designate the front and rear axles of the truck, said axles being connected with the platform 7 by means of supporting structures 8 (Fig. 3) and 9 (Fig. 5), 8 designating the forward supporting mechanism and 9 the rearwardly located structure. The mechanism 8 as disclosed in the drawing consists of two pairs of bars 10 and 12, the bars 13 of the forward pair being pivotally connected with the fifth wheel 15, as shown at 16, while their opposite extremities are hingedly connected with the platform, as shown at 17. The fifth wheel is provided with lateral projections 18 upon which are formed journals which are engaged by the lower extremities of the bars 13. The pair of bars 12 is composed of two members 20 which are pivotally connected with the fifth wheel, as shown at 21, while their upper extremities are pivotally or hingedly connected with the platform, as shown at 22. The two bars 13 of the one pair are parallel with each other, which is also true of the two members 20 of the other pair. Furthermore, the two pairs 10 and 12 are arranged in parallel relation and coöperate with each other during the raising and lowering of the platform, as will be hereinafter explained.

Each of the pairs or members 20 has secured thereto as shown at 23, a brace 24 which merges into a part 25 which when the platform is raised engages its under surface and forms a stop to prevent further movement. These parts or shoulders 25 also provide an efficient bearing for the platform upon the supporting structure when the platform is in the elevated position. The fifth wheel member 15 is pivotally connected with the axle, as shown at 26, while the base 27 of the fifth wheel is rigid with the front axle 5 and is provided with a forward projection 77 with which the tongue 28 of the vehicle is equipped.

The forward portion of the lifting or elevating structure also includes a lever 29 fulcrumed on the fifth wheel, as shown at 30, the fulcrum being located approximately midway of the length of the lever. Pivotally connected with the upper extremity of this lever, as shown at 31, is the forward extremity of a link 32 whose rear extremity is pivotally connected, as shown at 33, with one extremity of a crank arm 34 whose opposite extremity is secured, as shown at 35, to a rock shaft 36 which is journaled in the members 20 of the pair of bars 12. This rock shaft is further equipped with forwardly extending crank arms 37 whose free extremities carry anti-frictional rollers 38 which are adapted to engage the under surface of the platform during the initial elevating movement as hereinafter more fully explained. Connected with the lower extremity of the lever 29, as shown at 39 are the ends of two cables 40 whose opposite extremities are connected with a drum or roller 41 journaled in hanging brackets 42 secured to the under surface of the platform, as shown at 43. Attention is called to the fact that the lower extremity or arm of the lever 29 is provided with two parts 3 extending in opposite directions and which terminate in eyes with which the forward extremities of the cable 40 are connected. Fast to the central portion of this drum or roller is a worm wheel 44 which is engaged by a worm 45 formed on a longitudinally disposed shaft 46 journaled in bearings 47 carried by the platform. The worm shaft 46 also carries a worm wheel 48 which engages a worm 49 formed on a shaft 50 whose opposite extremities are fashioned to interlock with hand cranks 51 (see Fig. 1.)

Assuming that the platform is in the lowermost position, as shown by full lines in Fig. 2, as the drum or roller 41 is rotated in the proper direction, the lever 29 will be actuated to throw its upper arm forwardly which will impart such movement to the crank arm 34 through the medium of the connecting rod or link 32, as to actuate the rock shaft 36 and cause the crank arms 37 to impart a lifting movement to the platform 7 in conjunction with a similar movement imparted by the lifting mechanism in the rear as hereinafter more fully explained. After the platform has been raised to such an extent that the link 32 and the crank arm 34 are in the straight line position (see dotted lines in Fig. 2) the crank arms 37 can perform no further lifting function and the pull of the cables 40 will be directly on the forward axle 5 through the medium of the lever 29, and the axle 5 with its wheels will be moved rearwardly carrying the lower extremities of the supporting bars 13 and 20 with them and forcing their upper extremities upwardly until the shoulders 25 engage the lower surface of the platform when the latter is at the maximum elevation.

Hingedly connected with the rear axle 6 as shown at 52 are two supporting members 53 which constitute the rear supporting structure 9. Each of these members 53 is approximately triangular in shape and strengthened by braces 54. Furthermore, each triangular member 53 is hingedly connected with the platform, as shown at 55 and is provided with a shoulder 56 which engages the surface of the platform when the latter is at its maximum height. The two members 53 are connected and strengthened by cross bars 57 (see Fig. 1).

Journaled on the rear axle 6 is a sleeve 58 which carries two spaced crank arms 59 and a centrally located crank arm 60. The two crank arms 59 extend downwardly from the sleeve and with their lower extremities are respectively connected cables 61 whose opposite extremities are connected with the winding drum or roller 41, as shown at 62. The crank arm 60 extends outwardly from its sleeve and pivotally connected with its upper extremity, as shown at 63, is one extremity of a link 64 whose opposite extremity is pivotally connected, as shown at 65 with a crank arm 4 of a rock shaft 66 whose opposite extremities are journaled in the members 53 of the supporting structure 9. This rock shaft carries two crank arms 67 respectively equipped with anti-frictional rollers 68 which act upon the under surface of the platform during the initial lifting operation.

Assuming that the platform is in the lowermost position (see full lines in Fig. 2) and it is desired to elevate the same, the roller 41 is actuated as heretofore explained, whereby the cables 61 as well as the cables 40 are wound upon the roller. The operation of the forward lifting structure during this time has already been explained. During this initial winding operation the cables 61 acting on the crank arms 59 will impart partial rotary movement to the sleeve 58, whereby the upper extremity of the crank arm 60 will be moved rearwardly and the link 64 actuated to rotate the rock shaft 66 through the medium of the depending crank arm 4 connected with the rock shaft, as heretofore explained. As the movement is imparted to the rock shaft the crank arms 66 are actuated to cause their roller extremities to act upon the under surface of the platform 7 and impart lifting movement thereto until the platform has been elevated sufficiently to cause the link 64 and the crank arm 4 to assume the straight line position (see dotted lines in Fig. 2). As soon as this occurs the crank arms 67 will cease to perform their lifting function since no further independent movement can be imparted to the shaft 66, and subsequently the power will be directly applied to the rear axle to move the latter forwardly or toward the forward axle 5, thus continuing the elevation of the platform until the shoulder 56 engages the lower surface of the platform.

From this it will be understood that the two sets of operating or lifting devices coöperate to elevate the platform in a horizontal position during the rotation of the roller or drum 41. It should be explained that this roller or drum may be power operated, as by the employment of an electric motor, gas engine, or other suitable power. Furthermore, the truck may be moved from place to place by the employment of a motor of any suitable character as electric or gas.

After the platform with its load has been raised to the desired elevation and the load removed, the platform may be lowered by reversing the rotary movement of the roller 41, as will be readily understood. Again, the platform if elevated to receive a load, may be lowered to the desired position with the load thereon by reversing the roller or drum 41 or turning the latter in the proper direction. As shown in the drawing, the worm gear mechanism will serve as a proper brake or locking means for maintaining the platform in any desired position. It is evident, however, that other gearing or operating mechanism may be employed and that any desired braking structure may be employed if such should be found necessary, without in any way departing from the spirit of the invention.

Having thus described our invention, what we claim is:—

1. A truck including front and rear wheeled axles, a platform, a foldable connection between the platform and the axles to permit simultaneous longitudinal travel of the axles and vertical adjustment of the platform, means connected to said foldable connection for imparting lift to the platform, said means including a link, a lever fulcrumed on the axle structure and connected at one end with the link and at the other with a power connection.

2. A truck including front and rear wheeled axles, a platform, a foldable connection between the platform and the axles to permit simultaneous longitudinal travel of the axles and vertical adjustment of the platform, means connected to the foldable connection for imparting lift to the platform, said means comprising an arm pivotally mounted on said foldable connection, a lever fulcrumed on the axle structure, a link connected at one end with said arm, and at the opposite end with one end of said lever, and a power connection with the free end of said lever.

3. A truck including a wheeled axle and a platform, a foldable structure between the platform and the axle to permit vertical adjustment of the platform, said structure comprising longitudinally spaced parallel bars, a member pivotally connected with one of said bars, a link connected at one end with said member, a lever fulcrumed on the axle structure and connected at one extremity with the other end of said link, and a power connection with the opposite extremity of the lever.

4. A truck including a wheeled axle, a fifth wheel and a platform, a foldable structure between the fifth wheel and the platform to permit vertical adjustment of the platform and comprising longitudinally spaced parallel bars, a member pivotally connected with one of said bars, a link connected at one end with said member, a lever fulcrumed on the fifth wheel structure and connected at one extremity with the other end of the link, and a power connection with the opposite extremity of the lever.

5. A truck including front and rear wheeled axles, a platform, a foldable connection between the platform and the axles to permit simultaneous longitudinal travel of the axles and vertical adjustment of the platform, and auxiliary means carried by the said foldable connection for imparting the initial lift to the platform.

6. A truck including front and rear wheeled axles, a platform and a longitudinally foldable connection between the platform and axles to permit simultaneous longitudinal travel of the axles and vertical adjustment of the platform, auxiliary means carried by the said foldable connection for imparting the initial lift to the platform, an operating member and an operative connection between said member and the said auxiliary means for imparting a limited initial movement to the platform directly, the power of the operating member being subsequently directly applied to the axles to impart longitudinal travel to the latter and vertical travel to the platform through the medium of the said foldable connection.

7. A truck including a wheeled axle, a fifth wheel and a platform, a foldable structure between the fifth wheel and the platform to permit vertical adjustment of the platform and comprising longitudinally spaced parallel bars hingedly connected at one end with the platform and at the opposite end with the fifth wheel structure, a lever fulcrumed on the fifth wheel structure, a link interposed between the foldable structure and the lever and connected with both for lifting purposes and a power connection with the lever.

8. A truck including front and rear wheeled axles, a platform, a foldable connection between the platform and the axles to permit simultaneous longitudinal travel of the axles and vertical adjustment of the platform, auxiliary means carried by the said foldable connection for imparting the initial lift to the platform, said means including a rock shaft, a crank arm connected therewith and adapted to engage the platform for lifting purposes and means for operating the rock shaft.

9. A truck of the class described including front and rear wheeled axles, a platform, a foldable connection between the platform and the axles to permit simultaneous longitudinal travel of the axles and vertical adjustment of the platform, auxiliary means carried by said foldable connection for imparting the initial lift to the platform, said means including a rock shaft, a crank arm connected therewith and adapted to engage the platform during the initial lifting movement, a second crank arm also connected with the rock shaft, a lever fulcrumed on the axle structure, a link connecting one arm of said lever with the second crank arm of the rock shaft, and a power connection with the opposite arm of said lever.

10. A truck of the class described including a platform, front and rear wheeled axles, front and rear supports for the platform, the front support being hingedly connected with the fifth wheel structure at one extremity and with the platform at its opposite extremity, the rear support being hingedly connected with the platform at one extremity and with the rear axle at its opposite extremity, means carried by each of said supports and coöperating to impart the major lifting movement to the platform and additional means carried by said supports to impart initial lifting movement to the platform.

11. A truck including front and rear wheeled axles, a platform, a foldable connection between the platform and the axles to permit simultaneous longitudinal travel of the axles in opposite directions and vertical adjustment of the platform while the truck as a whole remains stationary with respect to longitudinal movement, means connected to said foldable connection for imparting lift to the platform, said means including a link, a lever fulcrumed on the axle structure and connected at one end with the link and at the other end with power transmitting means.

In testimony whereof we affix our signatures.

AXEL G. STEPHENSON.
HARRY H. BARSBY.

Copies of this patent may be obtained for five cents each, by addressing the "Commissioner of Patents, Washington, D. C."